(12) United States Patent  
Pelletier et al.

(10) Patent No.: US 9,823,419 B1  
(45) Date of Patent: Nov. 21, 2017

(54) OPTICAL COUPLING SURFACE FABRICATION

(71) Applicants: Francois Pelletier, St-Augustin (CA); Michel Poulin, Quebec (CA); Marie-Josée Picard, Ancienne-Lorette (CA); Christine Latrasse, Quebec (CA)

(72) Inventors: Francois Pelletier, St-Augustin (CA); Michel Poulin, Quebec (CA); Marie-Josée Picard, Ancienne-Lorette (CA); Christine Latrasse, Quebec (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/279,684

(22) Filed: Sep. 29, 2016

(51) Int. Cl.
*G02B 6/122* (2006.01)
*G02B 6/136* (2006.01)
*G02B 6/30* (2006.01)
*G02B 6/12* (2006.01)

(52) U.S. Cl.
CPC ............... *G02B 6/30* (2013.01); *G02B 6/122* (2013.01); *G02B 6/136* (2013.01); *G02B 2006/12176* (2013.01)

(58) Field of Classification Search
CPC .......... G02B 6/122; G02B 6/136; G02B 6/30; G02B 2006/12176
See application file for complete search history.

(56) References Cited

U.S. PATENT DOCUMENTS 5,175,781 A * 12/1992 Hockaday ............... G02B 6/30
385/49
2015/0247974 A1  9/2015 Painchaud et al.

OTHER PUBLICATIONS

"Stealth Dicing Technology and Applications," Hamamatsu Photonics K.K., Mar. 2005 (8 pages).

\* cited by examiner

*Primary Examiner* — Jerry Rahll
(74) *Attorney, Agent, or Firm* — Osha Liang LLP

(57) ABSTRACT

An optical system may include a substrate that includes an etched region and a laser-induced breakage region. The optical system may further include an optical waveguide disposed on the substrate. The optical system may further include an optical device coupled to the optical waveguide within the etched region. The laser-induced breakage region may produce a predetermined coupling gap between the optical waveguide and the optical device.

20 Claims, 5 Drawing Sheets

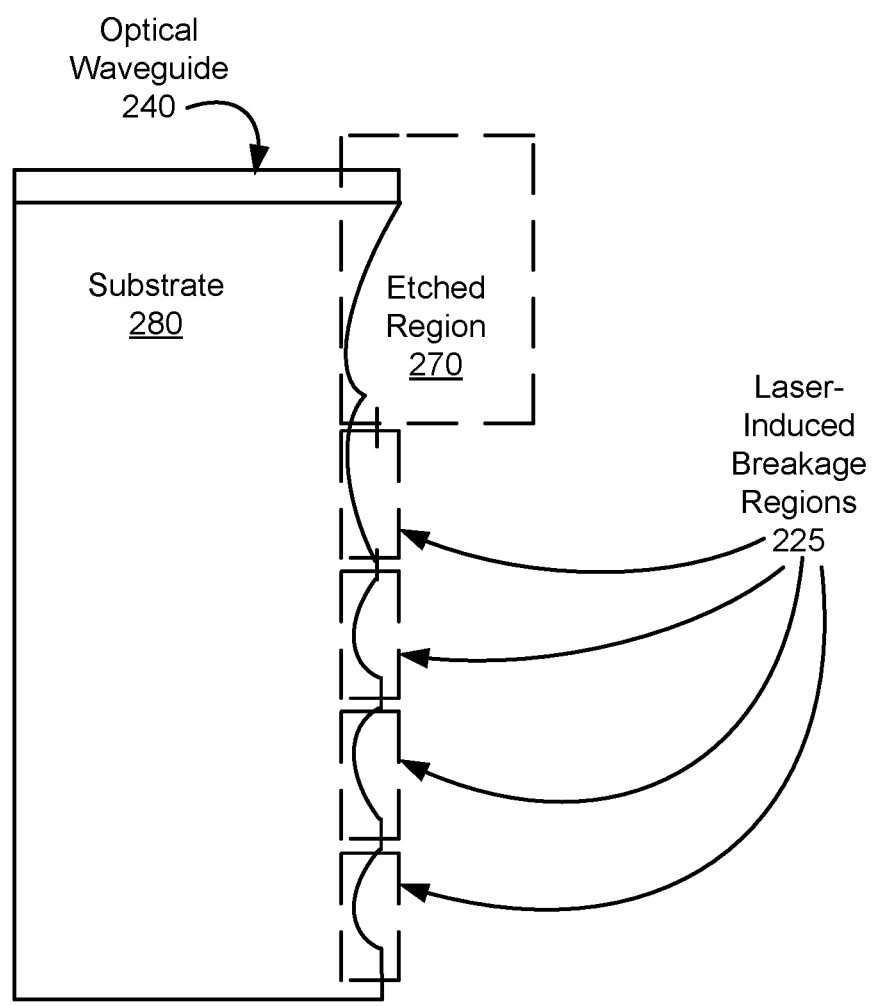
FIG. 2.1

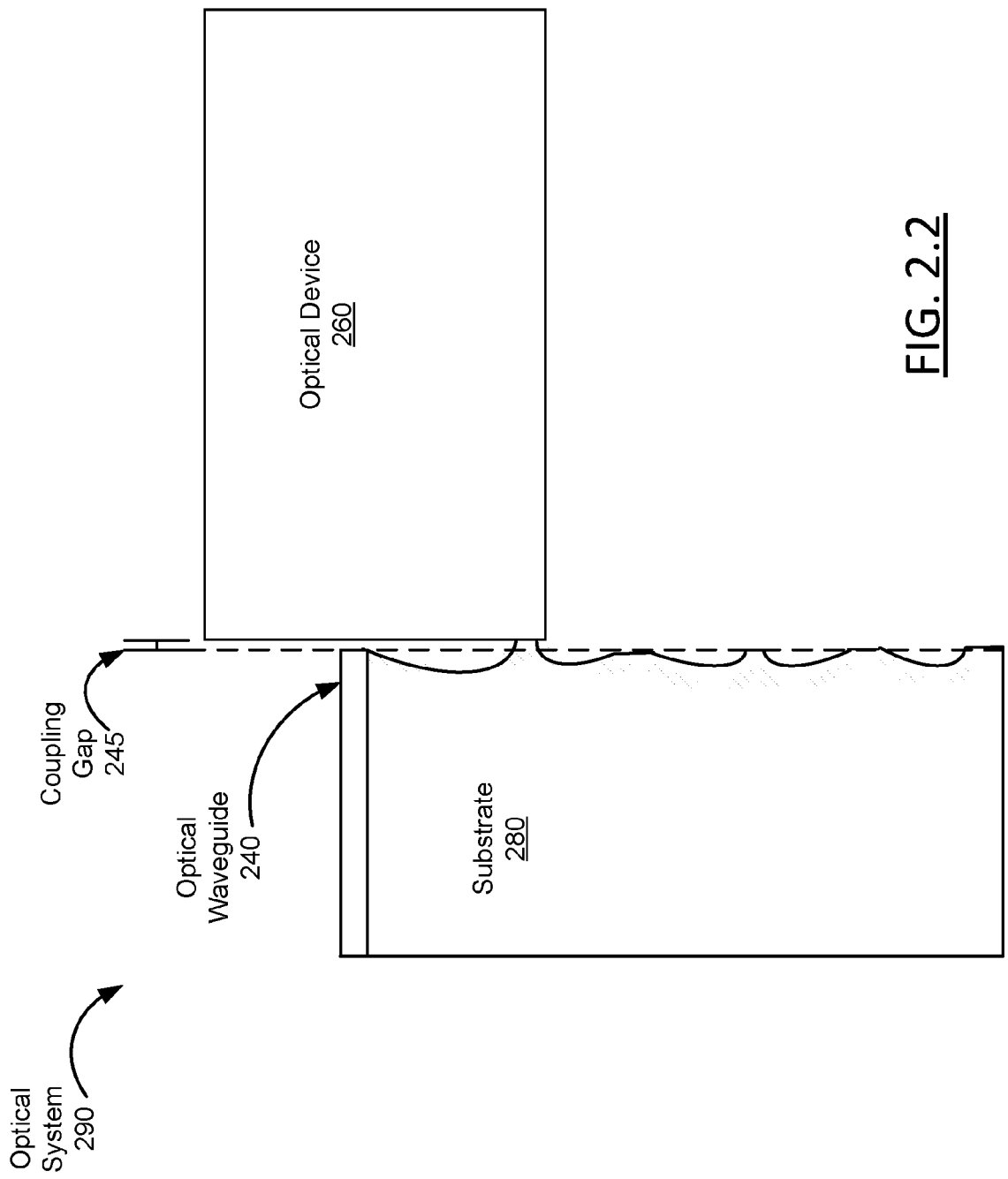
FIG. 2.2

OPTICAL COUPLING SURFACE FABRICATION

BACKGROUND

Photonic integrated circuits (PICs) are devices that may perform various optical functions similar to an electronic integrated circuit. For example, optical waves may pass from a PIC into an optical waveguide, such as an optical fiber. PICs may be integrated with electronic integrated circuits into a single chip or into a multi-chip module.

SUMMARY

In general, in one aspect, embodiments relate to an optical system that includes a substrate that includes an etched region and a laser-induced breakage region. The optical system further includes an optical waveguide disposed on the substrate. The optical system further includes an optical device coupled to the optical waveguide within the etched region. The laser-induced breakage region produces a predetermined coupling gap between the optical waveguide and the optical device.

In general, in one aspect, embodiments relate to a semiconductor wafer that includes a first substrate portion that includes an etched region. The semiconductor wafer further includes a second substrate portion that includes a laser-induced breakage region. The semiconductor wafer further includes a third substrate portion providing an optical waveguide for coupling to an optical device. The laser-induced breakage region produces a predetermined coupling gap between the optical waveguide and the optical device.

In general, in one aspect, the invention relates to a method of manufacturing an optical system. The method includes providing a substrate that includes an etched region. The method further includes transmitting a laser beam into the substrate to produce a stressed region in the substrate. The method further includes generating, within the stressed region, a tension to produce a laser-induced breakage region. The laser-induced breakage region produces a predetermined coupling gap between an optical waveguide disposed on the substrate with an optical device.

Other aspects of the invention will be apparent from the following description and the appended claims.

BRIEF DESCRIPTION OF DRAWINGS

FIGS. 2.1 and 2.2 show a system in accordance with one or more embodiments.

DETAILED DESCRIPTION

Figure 1:
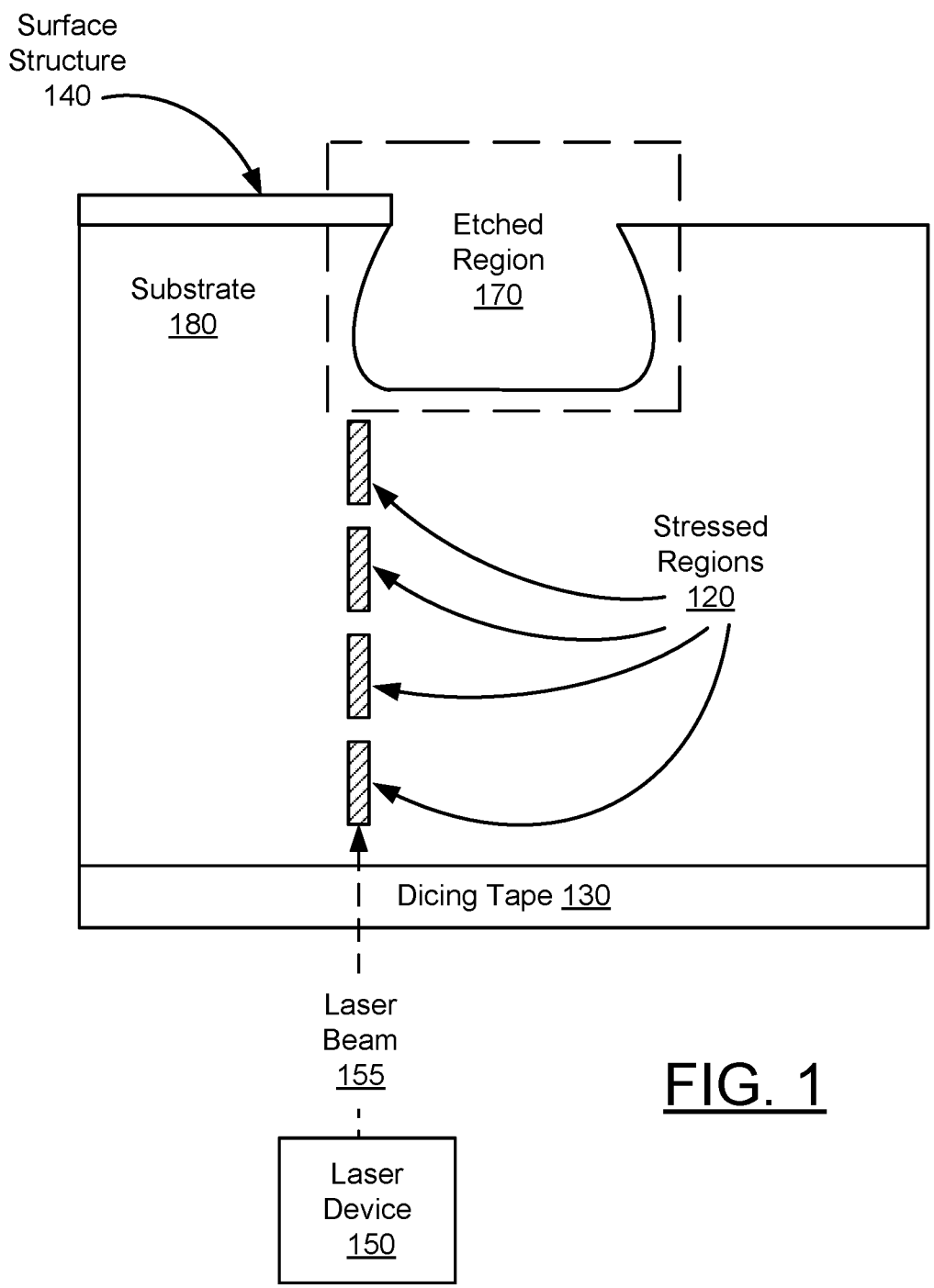
FIG. 1 shows a system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed towards an optical system, a semiconductor wafer, and a method for manufacturing an optical system. In particular, one or more embodiments are directed to a method that includes generating stressed regions within a substrate using laser beams. Specifically, the stressed regions may be configured to separate in response to a stress applied on the substrate. For example, the stressed regions may resemble a line or plane within the substrate that separates along the line or plane in response to an applied stress. After the substrate separates into two or more substrate portions, resulting laser-induced breakage regions may be found along the side of a resulting substrate portion at the location of the previous stressed regions. Accordingly, the resulting substrate portion may have little or no protrusion along the laser-induced breakage regions. As such, an optical device may be coupled to a surface structure on the resulting substrate with little or no coupling gap, e.g., a coupling gap less than 10 micrometers (μm) between the optical device and the surface structure. For example, the surface structure may be an optical waveguide and the optical device may be an optical fiber, where optical waves may pass between the devices and surface structure with little optical insertion loss due to the size of the coupling gap.

FIG. 1 shows a side view of a system for fabricating an optical device in accordance with one or more embodiments. In one or more embodiments, the system as shown in FIG. 1 includes a laser device (150) and a substrate (180) that includes an etched region (170). For example, the substrate (180) may be a semiconductor material, such as a silicon wafer. The etched region (170) may be a recess or cavity within the substrate (180) generated by applying an etching-process to the substrate (180). For example, the etched region (170) may be realized by 'deep trenching' and have an etching depth in the range of 10-200 micrometers. Thus, the etched region (170) may produce at least a portion of a facet configured for coupling with an optical device.

The laser device (150) may include hardware that includes functionality to transmit a laser beam (e.g., laser beam (155)) into the substrate (180). For example, the laser device (150) may include a lens (not shown) that includes functionality to focus the laser beam (155) at one or more specific locations in the substrate (180). In some embodiments, the laser device (150) may have no lens or other system to divide the beam.

Keeping with FIG. 1, in one or more embodiments, during transmission of the laser beam (155), light energy is absorbed at various points inside the substrate (180). As such, the absorption points may experience stress and thereby produce various stressed regions (e.g., stressed regions (120)) inside the substrate (180). In particular, laser-induced stress may produce a tensile stress and/or a compressive stress that results in volumetric expansion from localized polycrystallization in the stressed regions (120), for example. Likewise, in some embodiments, the stressed regions (120) have a width between 7 micrometers and 15 micrometers. In particular, length of a stressed region may be measured along an axis of a transmitted laser beam that produced the stressed region, while the width of the stressed region may be measured perpendicular to the axis.

In some embodiments, the laser device (150) generates the stressed regions (120) sequentially in time. For example, the laser device (120) may produce a vertical laser beam that generates an individual stressed region. Afterwards, the laser device (120) may refocus the vertical laser beam at a new location along the same vertical axis. As such, the vertical laser beam may generate another stressed region at a new location. The laser device (120) may repeat the process until a series of stressed regions are formed within the substrate (180).

Moreover, areas outside the stressed regions (120) may be undamaged, while the stressed regions (120) may undergo a decrease in breakage resistance due to micro-cracks within the stressed regions (120). Thus, the stressed regions (120) may be compromised regions of the substrate (180) that are configured for separating in response to a specific applied stress, such as a tensile stress on the substrate (180). While the stressed regions (120) may appear on the exterior of the substrate (180), in one or more embodiments, the stressed regions (120) are located only in the interior of the substrate (180) and away from the surface of the substrate (180). For example, the laser device (150) may produce pulsed light beams such that multiple horizontal and vertical stressed regions that are not visible on the surface of the substrate (180). In one or more embodiments, the laser beam (155) generate a stress plane within the substrate (180) that may separate the substrate along a line or other geometric shape.

Furthermore, a laser-dicing technique shown in FIG. 1 may contrast with various laser-dicing techniques that cut a substrate from the outside. As shown, the laser device (150) may transmit the laser beam (155) into a side of the substrate (180) opposite the surface structure (140). As such, the laser-dicing technique may use a smooth surface on the substrate (180) as an entry point for a laser beam to prevent beam-scattering or disturbing any surface structures. In some embodiments, the laser device (150) may be transmitted into the substrate (180) on the side of the surface structure (140) as the entry point. Specifically, a laser beam may be configured to avoid any topography and/or metal located on the side of the entry point, such as the surface structure (140).

Keeping with FIG. 1, a dicing tape (130) may be disposed on a surface of the substrate (180). The dicing tape (130) may be a transparent adhesive that includes functionality to produce a tape expansion during a microfabrication process. In particular, an expansion of the dicing tape (130) may be produced by an external stress applied using an expansion device, such as a wafer expander. Likewise, the dicing tape (130) may be a backing tape that holds the substrate together while the laser device (150) produces the stressed regions (120). For example, the laser beam (155) may be transmitted directly through dicing tape (130) without affecting any fragile surface structures (e.g., surface structure (140)) on the opposite side of the substrate (180).

The substrate (180) may include a surface structure (140) fabricated from a surface of the substrate (140) and/or deposited on the surface of the substrate (140). For example, the surface structure (140) may be an optical waveguide that is produced using an etching process on a portion of the substrate (140). Moreover, the surface structure (140) may include other semiconductor structures such as microelectromechanical system (MEMS) devices, air bridges, etc.

Turning to FIG. 2.1, FIG. 2.1 shows a system in accordance with one or more embodiments. In one or more embodiments, the system as shown in FIG. 2.1 includes a substrate (280) with an etched region (270), an optical waveguide (240) disposed on the substrate (280), and various laser-induced breakage regions (225). In particular, the optical waveguide (240) may be disposed at the edge of the substrate (280) adjacent to the etched region in preparation of obtaining an optical coupling surface between the optical waveguide (240) and the optical device (260) as shown in FIG. 2.2. In one or more embodiments, for example, the laser-induced breakage regions (225) are the result of stressed regions after applying a tensile stress on the substrate (280). In particular, the stressed regions may be similar to the stressed regions (120) from FIG. 1. In response to applying the tensile stress on the substrate (280), the substrate (280) may separate along the stressed regions to produce the laser-induced breakage regions (225).

While the laser-induced breakage regions (225) may have an approximately dimensionless width measured with respect to the edge of the optical waveguide (240), stressed regions may have a larger width. As such, the laser-induced breakage regions (225) may result in a substantially uniform separation of the substrate (280) from the etched region (270) down the side of the substrate (280). While the laser-induced breakage regions (225) in FIGS. 2.1 and 2.2 show physical dimensions similar in size to the stressed regions of FIG. 1, the laser-induced breakage regions (225) in FIGS. 2.1 and 2.2 are exaggerated for illustration purposes.

Furthermore, the optical waveguide (240) may be a waveguide made from silicon on a silicon-on-insulator (SOI) wafer. The optical waveguide may be very narrow, such as between 200 nanometers (nm) and 500 nm in size and with functionality for transmitting optical waves at 1550 nm wavelength.

In FIG. 2.2, FIG. 2.2 shows an optical system (290) where an optical waveguide (240) is coupled with an optical device (260). In some embodiments, the optical device (260) can be hardware that includes functionality for transferring an optical wave to the optical waveguide (240), and/or receiving an optical wave from the optical waveguide (240). For example, the optical device (260) may be an optical fiber, a grin lens, an interposer, and/or a combination thereof. Likewise, the optical waveguide (240) may include a mode converter that is configured to couple an optical wave to the optical device (260) based on a predetermined electromagnetic mode. Electromagnetic modes may describes various sizes and/or shapes of optical waves. As such, the mode converter may be a spot-size converter. For more information on spot-size converters, see U.S. patent application Ser. No. 14/635,602, titled "SPOT-SIZE CONVERTER FOR OPTICAL MODE CONVERSION AND COUPLING BETWEEN TWO WAVEGUIDES", filed on Mar. 2, 2015, and which is incorporated herein by reference.

In one or more embodiments, for example, an optical coupling occurs between optical device (260) and the optical waveguide (240) using an inverted taper coupling technique. In an inverted taper coupling technique, a mode converter in the optical waveguide (240) may increase the Mode Field Diameter (MFD) of an optical wave's beam to approximately 3 µm. As such, the optical waveguide (240) may include a nano-sized taper within the optical waveguide (240). The nano-sized taper may have a narrow tip that causes an optical wave's beam to expand at the narrow tip before exiting the optical waveguide (240) and entering the optical device (260).

Moreover, in one or more embodiments, the optical waveguide (240) and the optical device (260) are connected using a butt coupling attachment technique. For example, in a butt coupling attachment technique, the optical device (260) may be attached directly to the side of the substrate (280) and without a lens or other beam-shaping structure interposed between the optical waveguide (240) and the optical device (260).

In one or more embodiments, the laser-induced breakage regions (225) provide a specific coupling gap (245) between the optical waveguide (240) and the optical device (260) that reduces or eliminates optical insertion loss. For example, when a substrate is separated with a dicing blade, the resulting substrate may have a protrusion that creates a coupling gap between an optical waveguide and an optical device leading to excessive insertion loss. The coupling gap (245) may refer to the space or distance between the optical waveguide (240) and the optical device (260) that an optical wave passes through. Likewise, a coupling gap of 10 μm may prevent an optical device from coupling using an inverted taper coupling technique, because of the amount of optical insertion loss produced by the respective coupling gap. Optical insertion loss may refer to a decrease in amplitude of an optical wave resulting from transfer of the optical wave from the optical waveguide (240) to the optical device (260), or vice versa.

By using the laser-dicing technique as described in FIG. 1, for example, the surface of the substrate (280) along the etched region (270) may be configured for a butt coupling attachment technique. Based on the reduced size of the coupling gap (245) from the laser-dicing technique, no or little optical insertion loss may be induced by the coupling gap (245). In one or more embodiments, the coupling gap (245) is less than 10 um. As such, the laser-dicing technique may remove a 'step' or protrusion adjacent to the etched region (270) that results in a coupling gap of 10-30 μm, and thus also remove the corresponding optical insertion loss.

Figure 3:
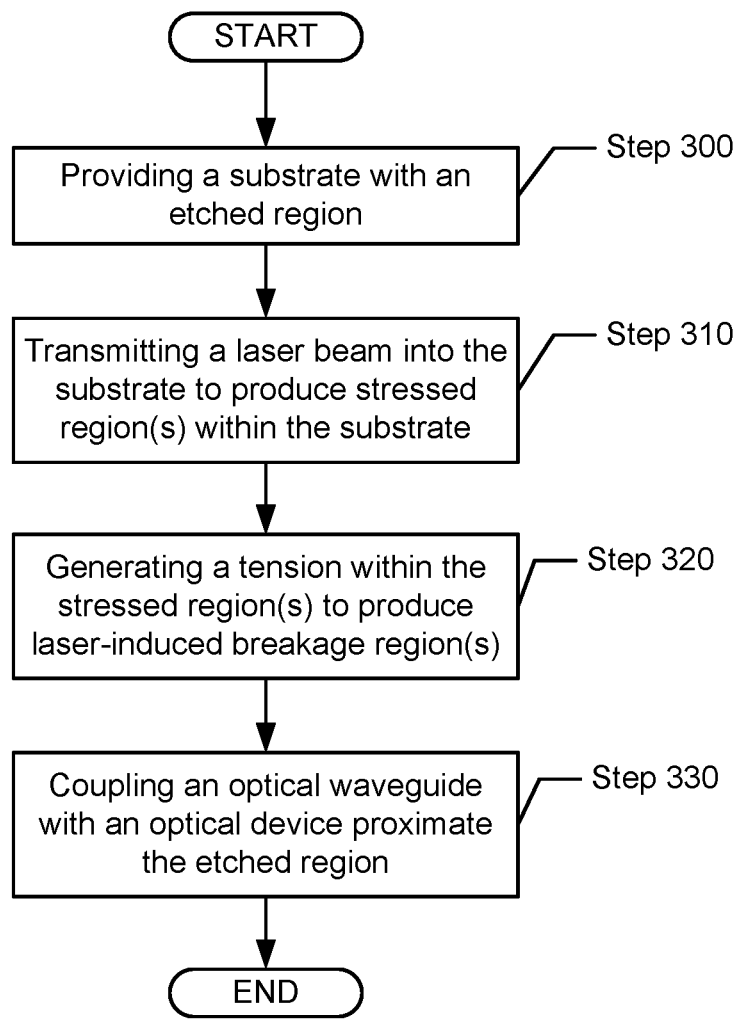
FIG. 3 shows a flowchart in accordance with one or more embodiments.

FIG. 3 shows a flowchart in accordance with one or more embodiments. Specifically, the process depicted in FIG. 3 may be a method of manufacturing an optical system. Likewise, the process shown in FIG. 3 may involve, for example, one or more components discussed above in reference to FIG. 1 or 2 (e.g., substrate (280)). While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, a substrate is provided with an etched region in accordance with one or more embodiments. For example, an etching-process may be applied to a substrate to produce the etched region. In one or more embodiments, for example, the etching-process is a deep reactive-ion etching process. However, various dry etching and/or wet etching processes may be used on the substrate to produce the etched region. The substrate may be similar as substrate (180) and/or substrate (280) as shown in FIGS. 1, 2.1, and 2.2 and the accompanying description.

In Step 310, one or more laser beams are transmitted into a substrate to produce one or more stressed regions within a substrate in accordance with one or more embodiments. For example, the laser beam may be produced by a laser device similar to laser device (150) as described in FIG. 1 and the accompanying description. Likewise, the stressed regions may be generated by a laser-dicing technique similar to the one described in FIG. 1 and the accompanying description. Specifically, while the etched region from Step 300 may provide a portion of a surface for coupling with an optical device, the laser beams may prepare the remaining portion of the substrate for separation by generating the one or more stressed regions.

In Step 320, a tension is generated within one or more stressed regions to produce one or more laser-induced breakage regions in accordance with one or more embodiments. In one or more embodiments, for example, the substrate from Step 300 may installed with a dicing tape. The dicing tape may undergo a tape expansion that generates a tensile stress throughout the substrate. Accordingly, the stressed regions from Step 310 may separate along the laser-induced breakage regions. While tape expansion is one method of generating tension throughout the substrate, other methods for generating tensile stress may be used as well.

In Step 330, an optical waveguide is coupled with an optical device proximate an etched region in accordance with one or more embodiments. For example, an adhesive layer may be disposed between an optical waveguide and the optical device to form a coupling attachment. Likewise, depending on the size of the optical device, the adhesive layer may be disposed along the surface of the etched region from Step 300 and along one or more laser-induced breakage regions. Furthermore, the optical device may be coupled to the optical waveguide using a mechanical support structure to fix the position of the optical device without an adhesive. The optical waveguide may be produced in the substrate before Step 300 and may be similar to the optical waveguide (240) described in FIGS. 2.1 and 2.2.

Furthermore, a dicing line width may refer to the required width for applying a process to separate a substrate, e.g., the width of a dicing blade in a blade dicing technique. Likewise, as the etched region in the substrate may be only a few micrometers in width and as the laser-dicing technique may also produce dies separation with substantially no width, the process described in FIG. 3 may thus reduce the dicing line width required for fabricating the optical system in Step 330. As such, the resulting substrate may have an increase in the quantity of dies. For example, the width of a wafer dicing line is normally in the range of 80-100 μm for accommodating a dicing blade that may be 40-50 μm wide. Accordingly, at the wafer scale, by reducing the etched region width from 100 μm down to 5 μm between each die, the number of dies may be increased over the entire wafer.

Figure 4:
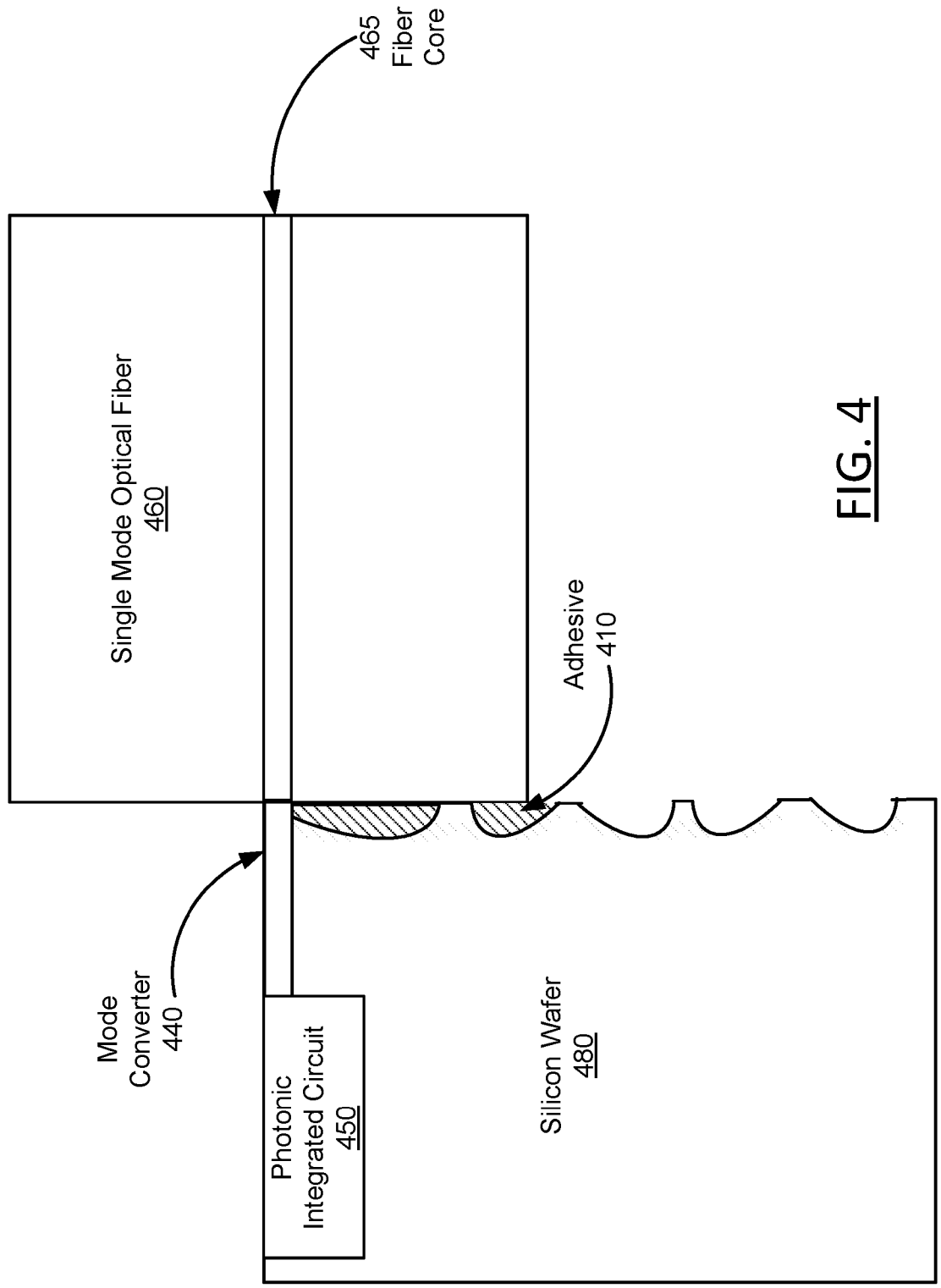
FIG. 4 shows an example of an optical system in accordance with one or more embodiments.

Turning to FIG. 4, FIG. 4 provides an example of an optical system fabricated by a laser-dicing technique. The following example is for explanatory purposes only and is not intended to limit the scope of the invention.

In FIG. 4, an optical system is shown that includes a silicon wafer (480) with a photonic integrated circuit (450) and a mode converter (SSC) (440). As shown, the mode converter (440) may optically couple the photonic integrated circuit (450) to the fiber core (465) of a single mode optical fiber (460). Accordingly, an optical wave may be transmitted from the photonic integrated circuit (450) to the mode converter (440) and transferred to the single mode optical fiber (460). Likewise, an adhesive (410) may be applied to the silicon wafer (480) to bond the single mode optical fiber (460) with the silicon wafer (480). As the silicon wafer (480) was diced with various laser-induced breakage regions, the coupling gap between the mode converter (440) and the single mode optical fiber (460) is negligible, resulting in substantially no optical insertion loss.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical system, comprising:
   a substrate comprising an etched region and a laser-induced breakage region;
   an optical waveguide disposed on the substrate; and
   an optical device coupled to the optical waveguide within the etched region,
   wherein the laser-induced breakage region is configured to produce a predetermined coupling gap between the optical waveguide and the optical device.

2. The optical system of claim 1, wherein the etched region is produced in the substrate by a deep reactive-ion etching process.

3. The optical system of claim 1, further comprising:
   a photonic integrated circuit coupled to the optical waveguide, wherein the photonic integrated circuit has a mode converter that is configured to couple an optical wave to the optical waveguide.

4. The optical system of claim 1, wherein the predetermined coupling gap is less than 10 micrometers.

5. The optical system of claim 1, wherein the optical device has a butt coupling attachment to the optical waveguide.

6. The optical system of claim 1, wherein the optical device is an optical fiber.

7. A semiconductor wafer, comprising:
   a first substrate portion comprising an etched region;
   a second substrate portion comprising a laser-induced breakage region; and
   a third substrate portion configured to provide an optical waveguide for coupling to an optical device,
   wherein the laser-induced breakage region is configured to produce a predetermined coupling gap between the optical waveguide and the optical device.

8. The semiconductor wafer of claim 7,
   wherein the etched region is produced in the first substrate portion by a deep reactive-ion etching process.

9. The semiconductor wafer of claim 7,
   wherein the predetermined coupling gap is less than 10 micrometers.

10. The semiconductor wafer of claim 7,
    wherein the predetermined coupling gap is configured for a butt coupling attachment between the optical device and the optical waveguide.

11. A method for manufacturing an optical system, comprising:
    providing a substrate comprising an etched region;
    transmitting a laser beam into the substrate to produce a stressed region in the substrate; and
    generating, within the stressed region, a tension to produce a laser-induced breakage region,
    wherein the laser-induced breakage region is configured to produce a predetermined coupling gap between an optical waveguide disposed on the substrate with an optical device.

12. The method of claim 11,
    wherein the stressed region is an area in the substrate with micro-cracks that produce a decrease in the breakage resistance within the stressed region.

13. The method of claim 11, further comprising:
    coupling the optical waveguide to the optical device.

14. The method of claim 13,
    wherein the optical waveguide is coupled to the optical device using an adhesive layer between the optical waveguide and the optical device.

15. The method of claim 11,
    wherein the etched region is produced in the substrate by a deep reactive-ion etching process.

16. The method of claim 11,
    wherein the predetermined coupling gap is less than 10 micrometers, and
    wherein the predetermined coupling gap is configured for a butt coupling attachment between the optical device and the optical waveguide.

17. The method of claim 11, further comprising:
    disposing dicing tape on the substrate,
    wherein generating the tension within the substrate comprises performing a tape expansion with the dicing tape to produce the laser-induced breakage region.

18. The method of claim 17,
    wherein the dicing tape is transparent, and
    wherein the laser beam is transmitted into the substrate through the dicing tape.

19. The method of claim 11,
    wherein the substrate further comprises a first surface and a second surface, the first surface being opposite to the second surface,
    wherein the first surface has an optical waveguide disposed on the first surface, and
    wherein the laser beam is transmitted through the second surface.

20. The method of claim 11,
    wherein the optical device is an optical fiber.

* * * * *